Sept. 5, 1967     C. F. HADLEY     3,340,499
DIGITAL SEISMIC RECORDING
Filed Feb. 7, 1966     3 Sheets-Sheet 1

CHARLES F. HADLEY
INVENTOR.
BY John D. Gassett
ATTORNEY.

Sept. 5, 1967     C. F. HADLEY     3,340,499
DIGITAL SEISMIC RECORDING
Filed Feb. 7, 1966     3 Sheets-Sheet 2
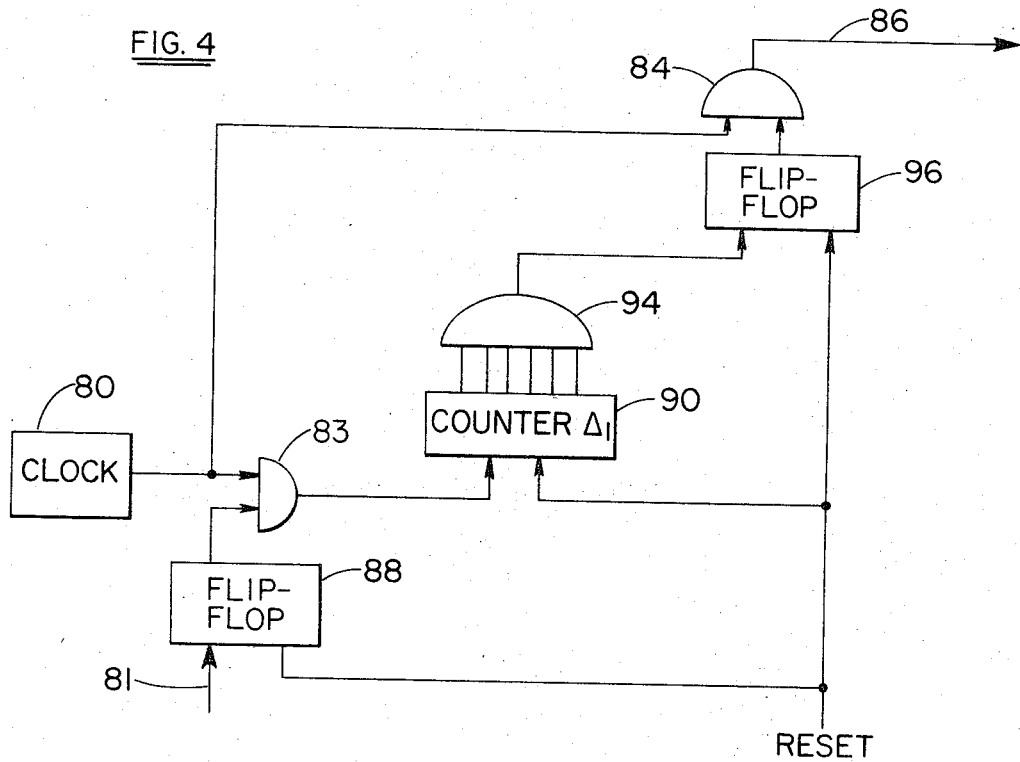
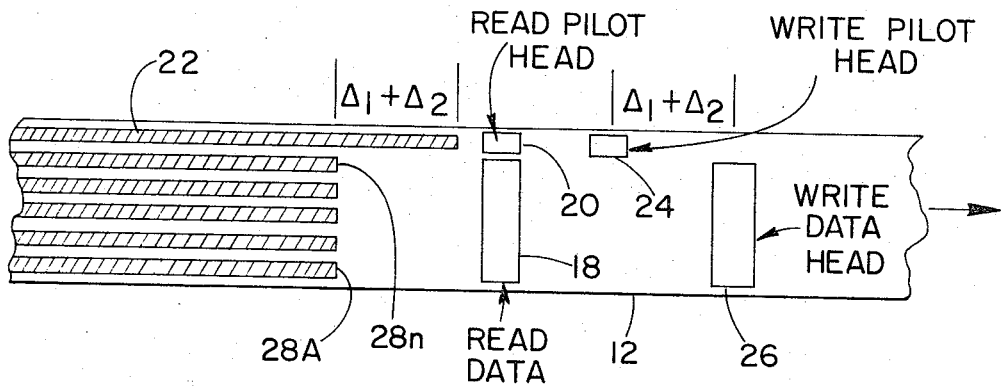
CHARLES F. HADLEY
INVENTOR.
BY John D. Gassett
ATTORNEY.

Sept. 5, 1967  C. F. HADLEY  3,340,499
DIGITAL SEISMIC RECORDING
Filed Feb. 7, 1966  3 Sheets-Sheet 3

REPRODUCED PILOT | | | | | | | | | | | | | | | A

PILOT CORE OUTPUT |←Δ₁→| | | | | | | | | | | | | B

VIBRATOR OUTPUT ⟨waveform⟩ C

DETECTED SIGNAL ⟨waveform⟩ D

INPUT TO DATA CORE | | | | | | | | | | | | | | | E

DATA OUTPUT |←Δ₂→| | | | | | | | | | | F

PREVIOUS SUM | | | | | | | | | | | G

NEW SUM | | | | | | | | | | | H

FIG. 3

CHARLES F. HADLEY
INVENTOR.

BY *John D. Gassett*

ATTORNEY.

United States Patent Office 3,340,499
Patented Sept. 5, 1967

3,340,499
DIGITAL SEISMIC RECORDING
Charles F. Hadley, Tulsa, Okla., assignor to Pan American Petroleum Corporation, Tulsa, Okla., a corporation of Delaware
Filed Feb. 7, 1966, Ser. No. 525,656
10 Claims. (Cl. 340—15.5)

ABSTRACT OF THE DISCLOSURE

A field recording and adding system for reducing the quantity of recording tape required. This system involves a sweep frequency seismic exploration system in which a vibrator is driven by sweep frequency control signal. Reflections from such signal are recorded. The same control signal, at a subsequent time, controls the seismic generator at the same location to impress another seismic wave into the earth. Reflections from this are detected simultaneously with the generating of the second seismic input signal. The first recorded seismic signals are reproduced and added to the reflections being detected from the second generation. The summed signal is recorded. The summed signal thus recorded is in turn added, in the field, to subsequently produced signals from the same generator being used.

---

This invention relates to the field of seismic prospecting. It relates especially to a method of field recording of multiple seismic signals.

Geophysical prospecting using artifically induced seismic disturbances has found widespread application in the search for petroleum. It is the general practice to initiate a seismic disturbance at a point near the surface of the earth to direct the seismic waves downward into the earth from that point. In the past this seismic disturbance was most frequently generated by detonating an explosive charge placed in a shot hole, i.e., a relatively shallow hole drilled in the earth. A method of generating a seismic disturbance which has recently attracted considerable interest is to couple a hydraulically actuated vibrator to the earth and control the vibrator with a pilot or a control signal. The pilot signal may last from one to six seconds or more. The generated seismic waves, which are directed downwardly, continue to travel until they encounter discontinuities in the earth's structure in the form of various subsurface formations. These discontinuities have the effect of reflecting a portion of the seismic waves back toward the surface of the earth. By arranging a plurality of geophones at a distance remote from the seismic disturbance point it is possible to detect the arrival of the reflected seismic waves at the surface of the earth. These detected waves are translated into electrical impulses which are indicative of the character of the ground motion and are usually referred to as a seismic signal or a seismic record which is in effect a composite signal made up of a plurality of electrical signals varying in frequency and in amplitude.

During recent years these seismic signals have normally been recorded as analog signals on magnetic tape. Recently however considerable interest has been shown in recording seismic signals in digital form. The seismic signal is normally detected by geophones as in the past to produce an analog signal. This analog signal is then fed to an analog to digital converter whose output is the seismic signal in digital form. In digital recording, many points are sampled for each cycle of the signal. The sampled signal at each point is converted to a digital number. It normally takes at least about 12 or 14 bits to define the number representing the amplitude of the signal at the point sampled. Thus it is seen that for each seismic signal there is a tremendous number of bits required to define that signal. Further, each such bit must be reproducibly recorded.

The quantity of the recording of seismic signals in digital form is especially severe in those systems using long time duration or continuous signals as pilot signals when such pilot signals are repeatedly used at the same or closely spaced locations such as in the so-called Vibroseis system such as described in U.S. Patent No. 2,688,124 for example. The use of vibrators has a handicap in that the power input is low. Thus when the vibrators are used the input signal must have a long time duration to obtain the total required energy.

When using vibrators as a seismic source, a control or pilot signal controls the movement of the vibrators so that the signal imparted into the earth faithfully follows the control signal. When using a low energy source such as a vibrator in comparison to an explosive charge, such as dynamite, one must use a long time duration or continuous signal to obtain the total required energy. If the pilot signal is of long duration, then one loses the advantage of high resolution of the ability to determine exactly when the long signal occurs in the record; that is, when the reflected signal is detected at the surface.

Thus if one wishes to use a vibrator, such as a commonly used hydraulically driven vibrator for imparting a seismic signal into the earth, one is required in effect to shorten or compress the long detected signal. One way of accomplishing this, which has become fairly popular is to choose as a pilot signal, a sweep frequency signal which sweeps linearly from one frequency $f_1$ to a second frequency $f_2$ in normally about six or seven seconds. The pilot signal is then cross-correlated with the received signal. The theory of correlation between two signals, or auto-correlation of one signal with itself, is well known and simply stated, is the operation of measuring the similarity between the two wave forms. If two wave forms $g(t)$, the pilot signal for example, and $r(t)$, the received signal for example, are considered within the time interval T, the finite cross-correlation function is expressed mathematically by $$\phi gr^{(\tau)} = \frac{1}{T}\int_0^T g(t)r(t+\tau)dt$$

The evaluation involves multiplication of corresponding ordinates and summing of the products for each of the many values of $\tau$. This evaluation is very readily performed on a modern digital computer, especially if the ordinates have been recorded in digital form. Thus it is seen that it is very desirable to record in digital form when using the Vibroseis system. However in applying regular digital recording to a continuous signal system, two problems are encountered which make such application rather expensive and thus reduces its practicablity. First a separate recording must be made for each detected signal each time the pilot signal actuates the hydraulic vibrator. The vibrator, for example, may be repeatedly actuated at one location or adjacent locations while leaving the geophones at their original positions. Further, the duration of the recorded seismic signal must be equal to the length of the pilot signal plus the two-way travel time through the seismic section of interest. If a typical pilot signal is 6 or 7 seconds in duration, for example, the recorded signal is about 12 to 14 seconds in duration. When an explosive charge is detonated in a shot hole drilled in the earth, the record of the received seismic signal is only about 6 or 7 seconds in length. Normally, the explosive charge detonation is not repeated at the same location. Further in exploring with explosive charges in shot holes for a given survey line of 10 miles, for example, there may be only 40 or 50 such shots. On the other hand when using the continuous signal system for the same survey line, the pilot signal may excite the vibrator as many as 200 or more times per mile or 2000 or more for the 10 mile survey. Thus the quantity of digital recording of the continuous signal is very large compared to that of explosive charge. Secondly, the computer will have to read each such tape before it can operate upon such signal. Further, as I indicated above, it is frequently desirable to repeat the long duration signal a number of times at the same location. In such event, the detected reflection signals for such repeated seismic wave are added by a central processing computer to obtain a master signal for each location. This reading and adding takes up very valuable computer time. It is an object of this invention to eliminate or reduce substantially both of these shortcomings by the use of the system of this invention which digitally sums the seismic data as it is recorded.

As I mentioned earlier when using the Vibroseis system, for example, the received signals must be correlated with the signal. In many instances the pilot signal is repeatedly imparted into the earth at one location or selected locations and repeatedly detected. In the processing of these signals in a digital computer, the many recorded seismic signals from the repeated pilot input signal are added by the computer to obtain a summed or master signal before they are correlated. In the system of this invention the many detected recorded signals, which are to be added together before correlation with the pilot or other signal, are sequentially accumulatively added as each new received signal is recorded to obtain a new summed signal. In other words the first detected signal is recorded on a reproducible medium to form a first recorded signal. Then the pilot signal again causes the vibrator to impart a seismic wave into the earth. This produces a second reflected signal which is detected at the surface. The first recorded signal is being reproduced while the second reflected signal is being detected. The second detected signal is added in proper time phase with the first recorded signal to obtain a first summed signal. The first summed signal is recorded on the same channel as that upon which the first signal was recorded. This is repeated until all the desired signals are summed to form a master signal. The master signal is then recorded on a more or less permanent computer tape which is used for supplying the master signal to a digital computer. Thus if there are, for example, 24 different settings or inputs of the pilot signal which are later to be added by a central processing computer, it is clearly seen that by the use of my system I use only $\frac{1}{24}$ of the amount of recording tape as would otherwise be required. This saves a tremendous amount of magnetic tapes, central computer reading time and computer adding time.

The details of a preferred system for carrying out this invention, a better understanding of the invention, and additional objects will become apparent from the following description taken in conjunction with the drawings in which:

FIGURE 2 shows in greater detail the spacing of the read and write heads for the tapes storage number 1 of FIGURE 1;

FIGURE 3 illustrates a timing diagram for different operations of FIGURE 1; and

FIGURE 4 illustrates one form of the unload control means of FIGURE 1.

Figure 1:
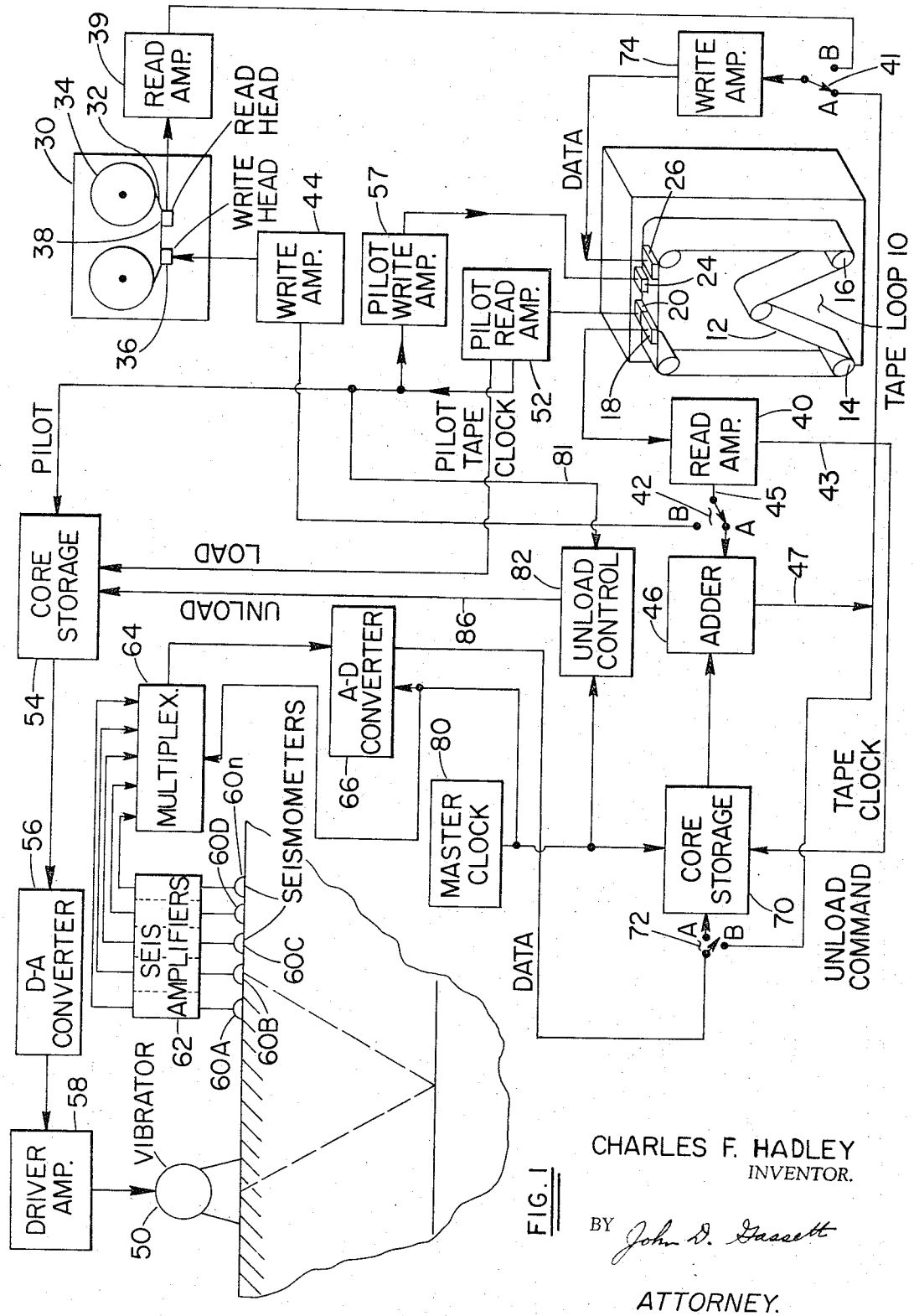
FIGURE 1 is a diagram of a digitally summed seismic recording system.

FIGURE 1 illustrates a preferred embodiment of my invention. Shown thereon is a tape loop storage 10 upon which an endless tape 12 is mounted on rollers 14 and driven by driver 16. It is upon this tape that the detected seismic signal is first recorded as digital seismic data and which recorded data is replaced by subsequently summed seismic signals until a master signal is obtained. This tape loop storage 10 has a relatively large read head 18 and a relatively smaller pilot read head 20 which as can be seen in FIGURE 2 is used to read channel 22 upon which the pilot signal is recorded. Head 18 is multi-head and reads individually data tracks 28A to 28n. There are normally many geophone locations for each seismic disturbance and the signal from each such location is independently recorded on channels 28A to 28n. The seismic signals can be recorded in multiplex form in a known manner so that they can be recovered. Means for recording data is either serial or in parallel form, and means for recovering such information are well known and will not be discussed here. Downstream, motion-wise, on tape 12 from the read head is a write pilot head 24 and a multi-write data head 26. As shown in FIGURE 2 the write pilot head 24 is set to write in advance of the writing of the seismic data signals on write and data head 26 by a distance of $\Delta_1+\Delta_2$. The purpose of this delay will become apparent with a discussion of the remainder of the system. It is sufficient now to say that this is to provide that the start of the reading of the pilot signal on channel 22 is begun at a time, $\Delta_1+\Delta_2$, in advance of the beginning of the reading of the seismic data on channels 28A to 28n.

A "permanent" tape recorder 30 is also provided. This recorder is called the permanent tape recorder for convenience or clarity as it is used to record the finally summed or master seismic signals. Recorder 30 includes magnetic tape 32 and roller and drive means 34, a write head 36 and a read head 38. Read head 38 is connected to read amplifier 39 which in turn is connected to the B terminal of switch 41. The A terminal of switch 41 is connected to the B terminal of switch 72 for recording the first seismic data (representing the first of a sequence of signals to be added together) on tape loop 10 before any other data is added thereto. Thus the reflected signals from a first pilot signal bypasses core storage 70 and adder 46.

The write head 36 of permanent tape recorder 30 is provided with connecting means to connect to read data head 18 of tape loop storage 10. This connecting means includes a read amplifier 40, switch 42 when in its B position, and write amplifier 44. Switch 42 is only placed in its B position when it is desired to record the summed or master seismic data in tape form such as for subsequent use with a digital computer. When switch 42 is in its A position, the output of read amplifier 40 is connected to adder 46. The input of read amplifier 40 is connected to read head 18. Read amplifier 40 has two outputs. The first output 45 is connected to adder 46 through switch 42 when in its A position. This output is merely pulses representing the digital information recorded on tape 12 and read by read head 18. Read amplifier 40 has a second output 43 which is a tape clock output. This tape clock output has a pulse for each time bit on tape 12 when read by head 18. In other words, the tape clock output has a pulse whenever a bit occurs on any of the data channels. As will be seen, this tape-clock is used to synchronize the adding of the previously recorded signal to a newly detected signal.

Attention will now be directed toward the means for supplying a pilot signal to hydraulic vibrator 50. As I have said before, vibrator 50 is preferably a hydraulic type vibrator which will faithfully follow an electrical signal fed to it. This pilot signal is obtained in the system of FIGURE 1 from read pilot head 20 which reads pilot signal from channel 22. Read pilot head 20 is connected to pilot read amplifier 52 which has an output which is a series of pulses representing the digital form of the pilot signal. The output of pilot read amplifier 52 is connected both to a core storage 54 and to a pilot write amplifier 57. I shall first mention the purpose of having the pilot signal conducted to the pilot write amplifier. The pilot signal from amplifier 56 is connected to write head 24 and is set a distance representing $\Delta_1$ and $\Delta_2$ in advance of write head 26. This provides a pilot signal in the proper position on tape 12 for the next seismic input or excitation of vibrator 50.

The other branch of the output of pilot read amplifier 52 is used to provide a control signal for vibrator 50; however it is first placed in a core storage 54. The utility of core storage 54 will be shown later. The pilot tape clock from pilot read amplifier 52 is connected to core storage 54 to tell it when to start storing and when to shift information within itself. As can be seen, unload control 82 commands core storage 54 to begin unloading at a time $\Delta_1$ after the beginning of the reproduction of the pilot signal by read head 20 by sending an unload signal over line 86. The output of core storage 54 is passed to a digital to analog converter 56 whose output is an analog signal representative of the pilot signal stored in core storage 54. The pilot analog signal is fed to vibrator drive amplifier 58 which amplifies the signal as required. The amplified pilot signal then controls vibrator 50.

The time relationships of various signals occurring at different points of the system are illustrated in FIGURE 3. There are illustrated in time occurrence form as regards the commencement of each signal illustrated and not in actual form. There are shown curves A through I. Curve A shows the start of the reproduction of the pilot in relation to the time that it begins its exit from core storage 54 as illustrated by curve B. Curve C shows that the vibrator 50 starts nearly simultaneously with the exit of the pilot signal from core storage 54.

Vibrator 50 imparts a seismic signal into the ground which very faithfully follows the pilot signal. The reflection of this input seismic signal is detected by seismometers or geophones 60A to 60n which are normally spaced apart in a desired arrangement. As is well known, the detected signal will occur slightly after the vibrator starts, depending largely upon how close the geophone is to the vibrator. Thus in FIGURE 3 curve D starts shortly after curve C starts although no appreciable time has been shown. Each geophone 60A may represent a geophone array at a given location. The output of each geophone 60A to 60n is fed to an amplifier bank 62 where the desired individual amplification of the signal from each geophone 60A to 60n takes place. Amplifiers for this purpose are well known. The amplified seismic signal for each amplifier 62 is connected to a multiplexer 64. Multiplexer 64 sequentially connects the different amplifiers 62 to an analog to digital converter 66. The time occurrence of the output of converter 66 is illustrated by curve E of FIGURE 3. Curve E begins nearly at the same time as curve D. As is well known, each of a plurality of analog signals can be sequentially sampled and the sampled signal converted to a digital form. By knowing the type multiplexing performed, one can recover the original signals from the multiplexed signal. The output of converter 66 is connected to the input terminal of switch 72. Terminal A of switch 72 is connected to a core storage 70. The time occurrence of the output of core storage 70 is begun $\Delta_2$ after the input is begun and is illustrated as curve F of FIGURE 3. Core storage 70, converter 66, multiplexer 64, and unload control 82 are all controlled by timing pulses from master clock 80.

The output of core storage 70 is connected to adder 46. When switch 72 is in its B position and switch 41 in its A position, the output of AD converter 66 is fed directly through write amplifier 74 to write head 26. When switch 72 is in its A position the output of converter 66 is connected to core storage 70. The output of core storage 70 is connected to adder 46. The output of core storage 70 is added to the output of read amplifier 40 when switch 42 is in its A position. The output of adder 46, like terminal B of switch 72, is connected to the input of write amplifier 74.

As I discussed earlier it is quite frequently desired to add a large number of time spaced signals detected by each geophone 60 together. By this it is meant in the system of FIGURE 1, that when geophone 60A receives a first signal it is recorded on tape 12; it receives a second reflected signal when a subsequent pilot causes vibrator 50 to impart a second seismic signal to the earth, the second reflected signal is added to the previously detected recorded signal. This is accomplished by recording the output of geophones 60A to 60n on tracks 28A to 28n in a given order, e.g., parallel or serial form, on tape 12. The second signals received by geophone 60A to 60n are amplified and converted to digital form and passed through switch 72 in its A position and core storage 70 to adder 46. The output of core storage 70 is at the command of the "tape clock" from read amplifier 40. The signal previously recorded on tape 12 for each channel is reproduced simultaneously with the tape clock and is transmitted to adder 46. This time of occurrence is shown on curves F and G of FIGURE 3. The transfer of data from core 70 is precision synchronized by the "tape clock" with the data reproduced from tape 12. The adder 46 then sums this previously recorded signal with the corresponding newly detected signal for each geophone and has summed data on output 47. The time occurrence of the added sum is shown by curve H of FIGURE 3. For a discussion of precision transfer, addition etc. of digital data, such as from and to cores, magnetic tape etc., reference is made to U.S. patent application S.N. 330,839, Charles F. Hadley and Daniel Silverman, filed Dec. 16, 1963, and assigned to Pan American Petroleum Corporation.

This summed output from adder 46 is recorded on tape 12 by write head 26. As is well known, write head 26 when recording, destroys any information which may have been on the tape and the information now recorded on channels 28A to 28n is the summed seismic data. For each revolution of tape 12 the pilot is read and re-written on the tape so that it can again be reproduced and used to drive vibrator 50 for a subsequent seismic input signal. This operation is repeated until as many subsequent seismic input signals have been generated, detected and added to the previously summed signals. The last summed signal for convenience can be called the "master" signal. The master signal is read by read amplifier 40 and passed through switch 42 which has been placed in the B position to write amplifier 44 for "permanent" recording upon computer tape 32. The tape 32 can then be used with a digital computer and all of the summing of various detected signals for a given location or locations of geophones 60A–60n have already been made.

Although it will seldom be desired, signals on tape 32 can be read and re-written on tape 12 of tape loop 10. For this, read head 31 is provided with its output connected to terminal B of switch 41.

Although I have discussed the above in regard to a vibrator putting in a continuous signal into the earth, the system can be used for other operations where it is desired to add subsequent detections from a geophone with a previously detected output. This then can be used with other type seismic sources such as weight dropping, explosive charges and the like.

I have previously described how the seismic signals are detected, recorded and summed with subsequent detected seismic signals and re-written on the same tape. Attention will next be directed toward the particular use of core storages 54 and 70 so that the different signals are added in the proper time sequence, that is, the first word of the previously recorded signal is added to the first word of the newly detected signal for the particular geophone location with which the signal is associated.

The shifting of the information through and out of core storage 54, and of core storage 70 is done in precise time. There is provided a central master clock 80 whose output is connected to multiplexer 64, core storage 70, and to unload control 82. Such control 80, as will be seen when FIGURE 4 is discussed, controls the unloading of core storage 54. The clock pulses from main clock 80 controls the shifting of information in core storage 70 in a regular and known manner. An unload "tape clock" from read amplifier 40 controls the unloading of core storage 70. A "pilot tape clock" from pilot read amplifier 52 likewise controls the loading of the pilot signal into core storage 54. Clock 80 is connected to control 82 and as shown in FIGURE 4 is connected more specifically to one of the inputs of a first "And" gate 83 and a second "And" gate 84. The output of second "And" gate 84 is connected through line 86, and can be called an "unload command," to core storage 54. When "And" gate 84 is enabled, an unload pulse from clock 80 goes to pilot core storage 54 for each pulse of the master clock. This tells the core storage 54 to transfer its stored information sequentially to the next stages and on out to digital to analog converter 56. However before "And" gate 84 is enabled there must be a signal from pilot read amplifier 54 which also passes through a delay before the "And" gate is enabled. When the first bit of the pilot is read, read amplifier 52 has an output which in addition to going to core storage 54, goes through conduit 81 to the "set" input of flip flop 88. This pulse causes flip flop 88 to have an output. This output is connected to one of the inputs of "And" gates 83. This enables "And" gate 83 and permits the clock pulse from clock 80 to pass through "And" gate 83 to a counter 90. Counter 90 serves as a delay equal to $\Delta_2$. Counter 90 can be a series of flip flops not shown, which has a series of outputs 92 which are connected to an "And" gate 94. When the pulse is passed through the counter so that each of the outputs 92 have the signal thereon "And" gate 94 has an output which is connected to the set of flip flop 96. This causes flip flop 96 to have an output which is connected to "And" gate 84. Thus when flip flop 96 has an output the pulses from clock 80 are permitted to pass through "And" gate 84 to control core storage 54. It is thus seen that after pilot head 20 reads a pilot signal there is a delay equal to $\Delta_1$ before the core storage 54 has an output. This particular $\Delta_1$ is also the same $\Delta_1$ shown throughout the drawings and especially in FIGURE 2. This delay is more or less a buffer for storage 54 as it is known that there are slight variations in the speed of magnetic tapes when they are being recorded upon or read from. Thus at a time delay of $\Delta_1$ after the first bit of the pilot signal is read, control unit 82 causes core 54 to begin unloading. Before each reading of the pilot signal, flip-flop 96 and counter 90 are reset. The reset signal can be applied manually or can be pulsed by a position switch, not shown, on tape loop 10 in a well known manner.

Seismic data core storage 70 also serves as a buffer so that the first bit of information of the newly detected signal can be passed to adder 46 and added with the first bit of the signal reproduced by read head 20 from tape 12. Core storage 70 is activated to have an output upon receiving an unload command from read amplifier 40. Amplifier 40 has an unload command upon reading the first bits of the signals on any of tracks 28A to 28n. In other words, an output on any one of these signals causes core storage 70 to have an output. The use of timing pulses from magnetic tape to provide a "tape clock" is well known. Thus the bits of information from core storage 70 is added to the proper bits of information read from read data head 20. As can be seen, the delay in core storage 70 is $\Delta_2$ and is preselected. The amount of delay $\Delta_2$ is largely dictated by the proable maximum error of speed of the tape loop 10. The size of $\Delta_2$ dictates the required storage capacity of cores 70.

While the above embodiment of my invention has been described with a certain amount of detail, various modifications can be made therein without departing from the scope of my invention.

I claim:

1. A method of field recording seismic signals which comprises
   (a) reproducing a control signal;
   (b) controlling a seismic generator with said control signal to impress a seismic wave into the earth;
   (c) detecting reflections from the seismic wave imparted into the earth by said seismic generator;
   (d) converting the detected reflections to digital data;
   (e) reproducibly recording said digital data;
   (f) repeating steps (a), (b), (c) and (d) at a subsequent time to obtain subsequent digital data;
   (g) reproducing the previously recorded digital data during step (f);
   (h) adding the subsequent digital data as it is obtained to the reproduced digital data as it is reproduced in step (g) to obtain a summed signal;
   (i) and recording the summed signal.

2. A method as defined in claim 1 including the erasing of the previously recorded digital data and recording the summed signal on the same channel of a recording medium from which the previously recorded digital data was reproduced.

3. A method as defined in claim 2 including recording the last summed signal on a separate recording medium.

4. A method as defined in claim 3 in which the start of the control signal is reproduced in advance of the start of the reproduction of the summed signals.

5. A method as defined in claim 1 in which steps (b) through (h) are performed for each of a plurality of geophone locations.

6. A method as defined in claim 5 in which said seismic generator is positioned at one location for each repeat of the steps.

7. An apparatus for seismic prospecting which includes:
   (a) means for repeatedly impressing upon the earth a plurality of seismic waves;
   (b) means for detecting reflections from each such seismic wave;
   (c) means for reproducibly recording the first reflection signal from the first generation as digital seismic data on a recording medium;
   (d) means for accumulatively adding the newly detected reflected signals to the previously recorded digital seismic data as each new reflected signal is received and recording the summed seismic digital data on said (c) means.

8. An apparatus as defined in claim 7 in which (a) means includes:
   pilot reproducing means for reproducing a pilot signal;
   a pilot core storage;
   means to unload said pilot core storage a period of time after the beginning of the reproduction of said pilot signal;
   a vibrator capable of following a pilot signal and capable of imparting a seismic signal into the earth;
   and means for connecting the output of said pilot core storage to said vibrator.

9. An apparatus as defined in claim 8 including a master clock whose output is connected to said pilot core storage for shifting the information stored therein.

10. An apparatus as defined in claim 9 wherein said (b) means includes:
    a plurality of geophones;
    an amplifier connected to each geophone;
    a multiplexer connected to the outputs of said amplifiers;
    an analog to digital converter connected to said multiplexer;
    a seismic data core storage connected to said analog to digital converter; and wherein said (d) means includes
    an adder having two inputs, one input connected to said (c) means for reproducing a previously recorded signal and the other connected to the output of said core storage;
    unload command means connected to said seismic data core storage to sequentially unload it in accordance with the reproduction of bit pulses of said recorded seismic data.

References Cited

UNITED STATES PATENTS

| | | | |
|---|---|---|---|
| 2,968,022 | 1/1961 | Unterberger | 340—15.5 |
| 3,134,957 | 5/1964 | Foote et al. | 340—15.5 |
| 3,185,958 | 5/1965 | Masterson et al. | 340—15.5 |
| 3,217,828 | 11/1965 | Mendenhall et al. | 340—15.5 |
| 3,252,148 | 5/1966 | Mitchell | 340—15.5 X |

BENJAMIN A. BORCHELT, *Primary Examiner.*

SAMUEL FEINBERG, *Examiner.*

R. M. SKOLNIK, *Assistant Examiner.*